June 5, 1962  E. ROTHSCHILD  3,037,608
ARTICLE TRANSPORTING MEANS
Filed May 31, 1960  3 Sheets-Sheet 1
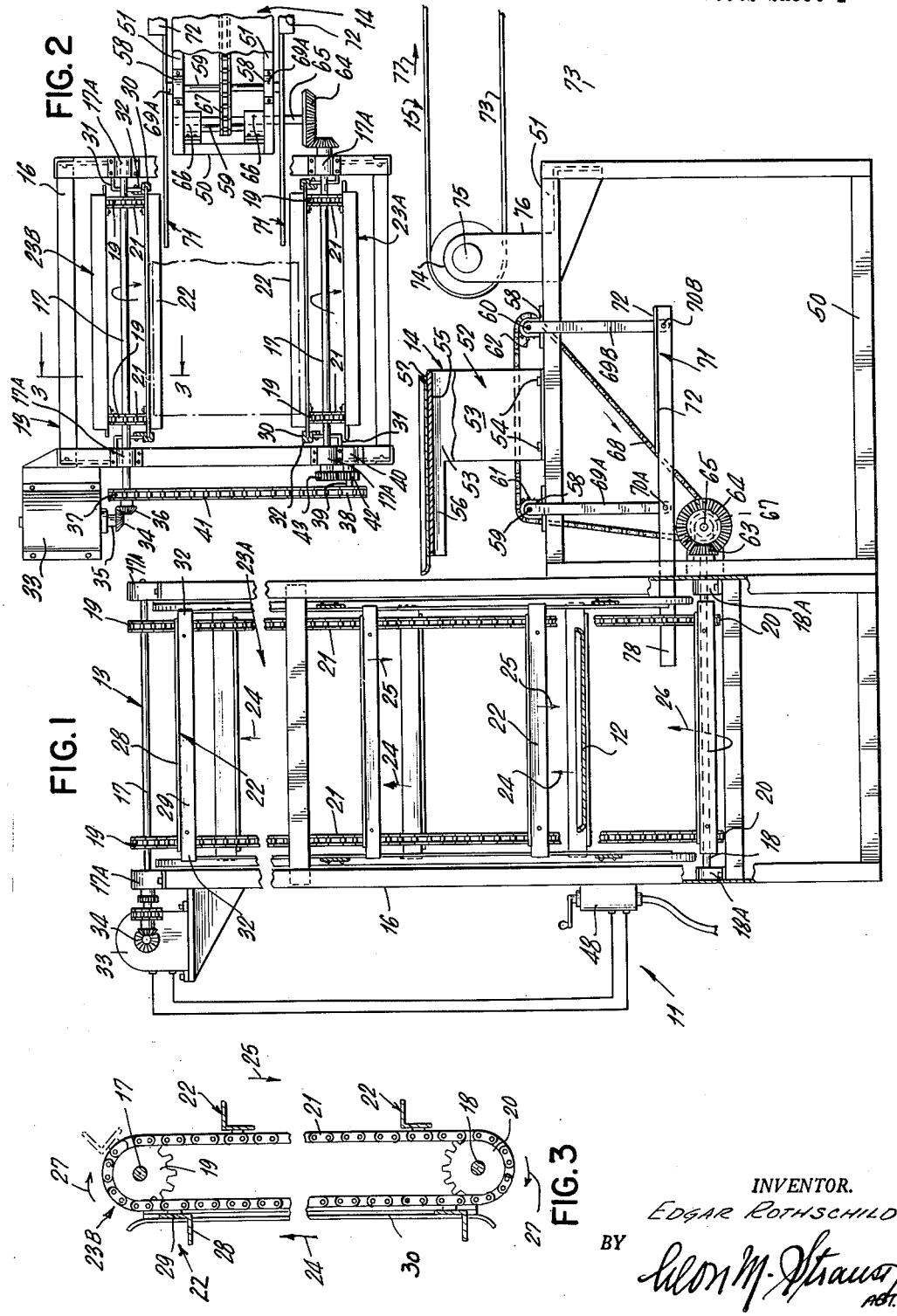
INVENTOR.
EDGAR ROTHSCHILD
BY June 5, 1962  E. ROTHSCHILD  3,037,608
ARTICLE TRANSPORTING MEANS
Filed May 31, 1960  3 Sheets-Sheet 2
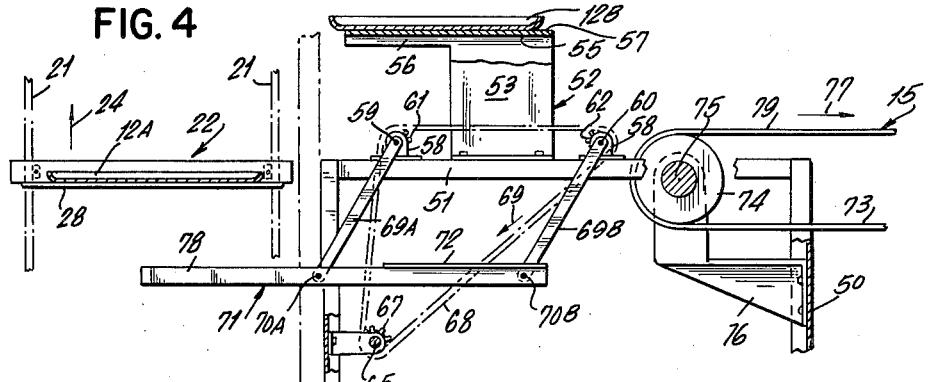
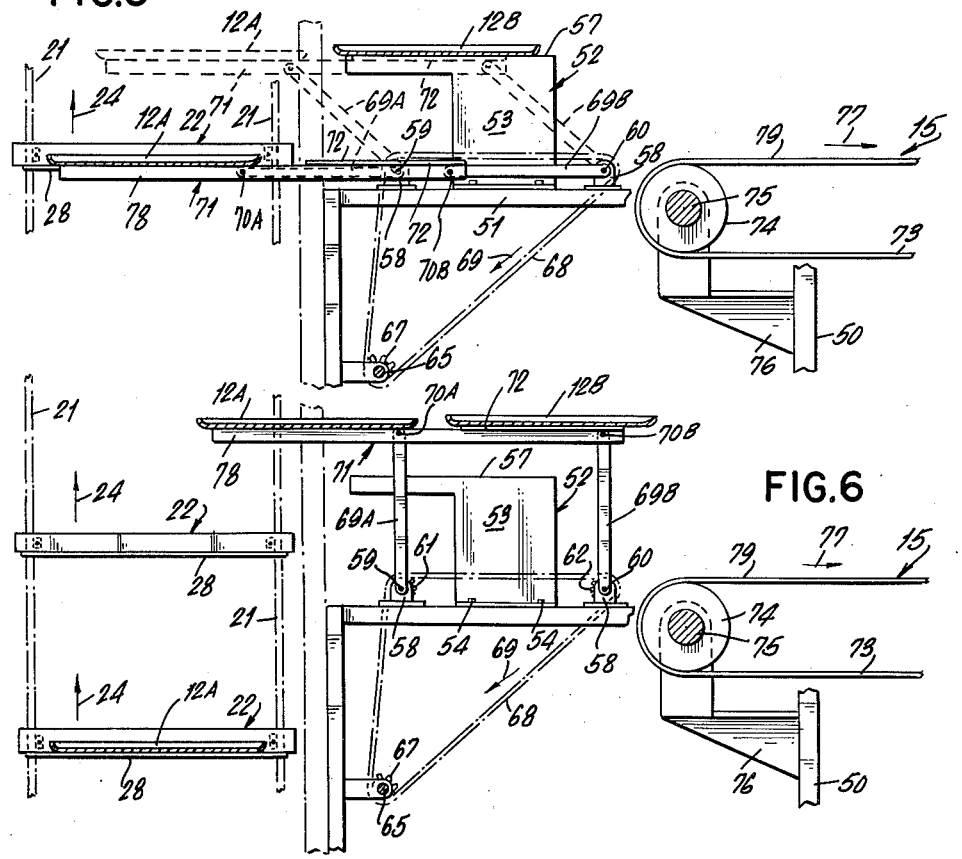
INVENTOR.
EDGAR ROTHSCHILD June 5, 1962 — E. ROTHSCHILD — 3,037,608
ARTICLE TRANSPORTING MEANS
Filed May 31, 1960 — 3 Sheets-Sheet 3
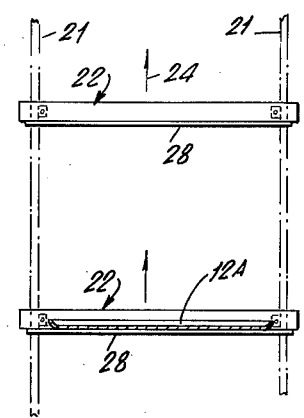
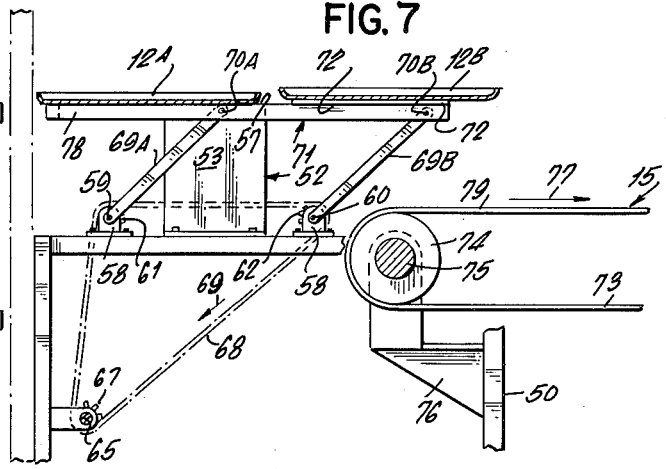
FIG. 7
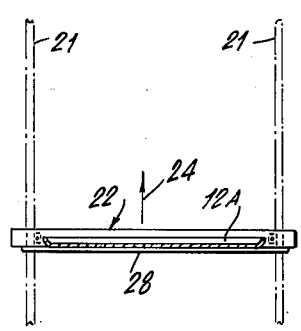
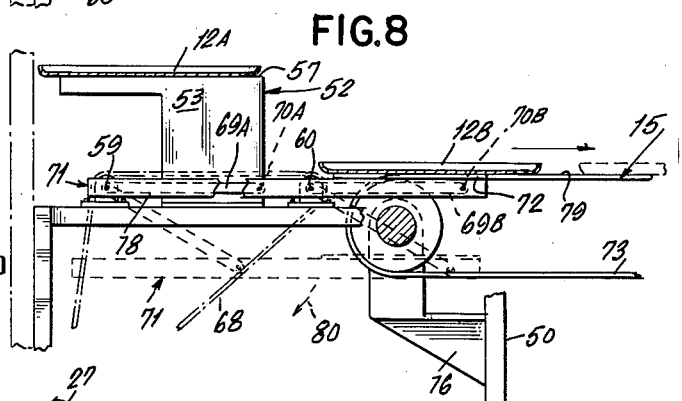
FIG. 8
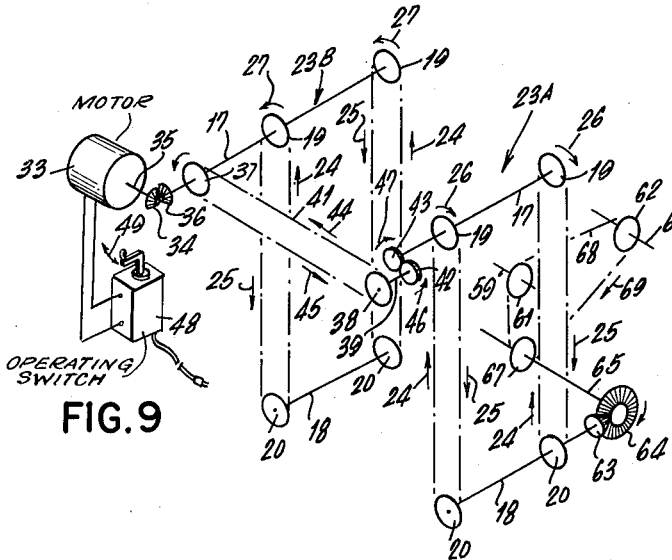
FIG. 9
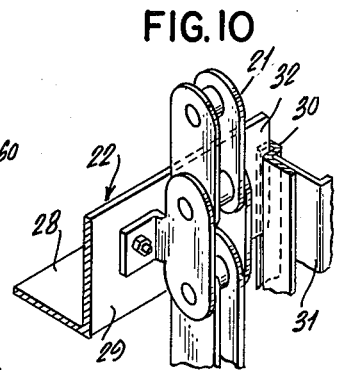
FIG. 10
INVENTOR.
EDGAR ROTHSCHILD
BY Leon M. Straus
AGT.

United States Patent Office 3,037,608
Patented June 5, 1962

3,037,608
ARTICLE TRANSPORTING MEANS
Edgar Rothschild, 1625 Paterson Plank Road,
Secaucus, N.J.
Filed May 31, 1960, Ser. No. 32,923
18 Claims. (Cl. 198—20)

This invention relates to a conveying and transfer apparatus and concerns more particularly the transporting of substantially flat or planar articles from one location to another location.

This invention is further directed to an apparatus for receiving tray-shaped articles after they have been treated or loaded and to transport such articles from a treatment location to a station at which use will be made of such tray-shaped articles.

It is one of the primary objects of the invention to provide means facilitating transporting an article or articles of the aforesaid type in substantially horizontal position, first in vertical or perpendicular direction and then impart to the article or articles a horizontal movement orienting the article or articles in a different direction while the same still remain in their level or horizontal position.

It is another object of the present invention to provide means affording conveying plate-shaped articles in different directions from the loading station to an unloading station and in timed relation to each other, whereby the articles may be displaced in spaced apart relation but remain substantially horizontal to each other.

Yet another object of the present invention is to provide means affording a single drive system or motor for operating a chain drive mechanism for moving the conveyor means by which the article or articles are displaced in desired horizontal position.

It is a further object of the present invention to provide means rendering the possibility of moving substantially flat objects uninterruptedly from a lower floor to an upper floor of a building and to discharge such flat articles or plates carrying on the top surface thereof any object or product whereby the same will be always maintained in their position on the surface while the plate or tray-shaped article remains in substantially horizontal position without being subjected to vibrations or irregular motions.

Still a further object of the present invention is the provision of means envisioning the transportation of flat articles from a loading station by first conveyor means, the displacement of said articles on second conveyor means and in a direction perpendicular to that of the first conveyor means, and then a further movement by third conveyor means whose action is coordinated to said first and second conveyor means thereby to orient the flat articles to a discharge station, which is remote from said loading station, while the flat articles are successively moved but always maintained in substantially horizontal position.

These and other objects of the invention will become further apparent from the detailed description, reference being made to the accompanying drawings, showing preferred embodiments of the invention.

In the drawings, which illustrate the best mode presently contemplated for carrying out the invention:

FIG. 1 is a side elevation of an article elevator and transfer apparatus pursuant to the present invention;

FIG. 2 is a top plan view of the apparatus;

FIG. 3 is a sectional view taken on the line 3—3 of FIG. 2;

FIGS. 4, 5, 6, 7 and 8 are fragmentary views similar to FIG. 1, and illustrate different operating positions of the apparatus; the latter being somewhat modified.

FIG. 9 is a schematic representation of the drive transmission; and

FIG. 10 is a fragmentary perspective view of the elevator mechanism.

Referring now to the drawings in detail, there is shown an article-handling apparatus or system 11, pursuant to the present invention, which serves to lift or elevate trays 12, or the like articles, for transfer from a loading station to a conveyor mechanism, or the like, for unloading. Briefly described, the apparatus 11 comprises an elevator or lift mechanism 13, which raises the individual trays to a transfer or removal position (FIG. 5) from which they are received by a transfer mechanism 14 which transfers the trays, individually from the elevator to a conveyor 15 for delivery to a predetermined unloading destination or station.

The elevator or lift mechanism 13 comprises an open framework 16 in which there is journalled as at 17A a pair of laterally spaced upper shafts 17—17 and as at 18A a pair of laterally spaced lower shafts 18—18. A pair of spaced chain sprocket gears 19—19 are keyed on each upper shaft 17 and a similar pair of spaced chain sprocket gears 20—20 are keyed on each lower shaft 18 (FIG. 9).

As best seen in FIGS. 1, 2 and 3, each upper gear 19 is paired with an associated lower gear in vertical registry therewith and each of such sets of paired gears mounts an endless sprocket chain 21. A plurality of spaced angle brackets 22 extend between each pair of sprocket chains, which are associated with the same set of upper and lower shafts 17 and 18 so as to constitute the two sprocket chain drive assemblies 23A and 23B in the elevator 13.

The sprocket chain drive assemblies 23A and 23B are driven in such manner that the brackets 22, which face inwardly of the elevator 13 between assemblies 23A and 23B ride upwardly, as shown by arrows 24, and those which face outwardly of the elevator, ride downwardly, as shown by arrows 25. To achieve this, assembly 23A is operated in the direction of arrows 26 (FIG. 9) and assembly 23B is operated in the direction of arrows 27.

It will be noted that each bracket 22 has a horizontal portion 28 and a vertical portion 29, the horizontal portion being below the vertical portion during upward movement of the bracket and above the vertical portion during downward movement of the bracket.

Confronting horizontal portions 28 of a pair of opposing brackets 22 in the assemblies 23A and 23B carry a tray 12 on the upper surface of the horizontal portions 28. To guide the brackets during said upward movements thereof, provision is made, outwardly of each chain 21, for a vertically extending track 30 (FIG. 10) mounted by supports 31, provided on frame 16. It will be noted that the vertical bracket portions 29 extend beyond the horizontal portions 28 to form projecting end portions 32 which slidably engage in the adjacent guides on tracks 30.

The sprocket chain assemblies are driven by a motor 33 which drives a crown gear 34, provided on motor shaft 35. Gear 34 meshes with a crown gear 36 keyed to upper shaft 17 of assembly 23B. Said shaft 17 mounts a sprocket gear 37. A companion sprocket gear 38 is mounted on a shaft 39 which is journalled on frame 16, as at 40. A sprocket chain 41 interconnects gears 37 and 38. Shaft 39 also mounts a gear 42 which meshes with a gear 43 provided on the upper shaft 17 of assembly 23A. Consequently, it will be apparent from FIG. 9 that operation of motor 33 in a direction to rotate assembly 23B, as shown by arrows 27, drives chain 41 in the direction of arrows 44 and 45 to rotate gear 42 in the direction of arrows 46 and gear 43 to rotate in the direction of arrows 47 so that assembly 23A rotates in the direction of arrows 26, opposite to and in timed relation with the direction of rotation of assembly 23B.

It will be understood that motor 33 is a reversible motor and that the direction of its rotation may be changed by operation of switch 48, which is operable in opposite directions from an Off position, as shown by arrow 49.

From the foregoing, it will be apparent that a tray 12 can be placed in position between the chain drive assemblies 23A and 23B by being mounted on a pair of confronting brackets 22 provided on said assemblies to be carried upwardly as each lowermost bracket moves upwardly from the lower sprocket gears 20 to the upper sprocket gears 19. When each tray 12 reaches a predetermined position during its upward movement, it is removed from the elevator or lift mechanism by the transfer mechanism 14.

The transfer mechanism comprises an open framework 50 provided with the laterally spaced upper frame members 51—51 which mount an inverted U-shaped pedestal or support 52 provided with the laterally spaced arms 53—53 secured to members 51, as at 54. Arms 53 are joined by a bight 55 which extends beyond the arms, as at 56 to define an enlarged platform 57 extending toward the elevator 13. On members 51 are mounted journals 58 for a pair of laterally spaced shafts 59 and 60 which extend therebetween, at opposite edges of pedestal arms 53.

Shaft 59 mounts a sprocket chain gear 61 and shaft 60 mounts a sprocket chain gear 62. The lower shaft 18 of chain drive assembly 23A mounts a crown gear 63 which meshes with a crown gear 64 mounted on a shaft 65 (FIGS. 1 and 2) journalled, as at 66—66. Shaft 65 mounts a sprocket chain gear 67. A sprocket chain 68 interconnects sprocket gears 61, 62 and 67 so that chain 68 moves in the direction of arrow 69, in timed relation with assemblies 23A and 23B during the previously described operation of the latter. The drive of the chain 68 by the gear 64 causes rotation of shafts 59 and 60.

At each end thereof, outwardly of the frame members 51, shaft 59 is connected to one end of a crank-arm 69A, and at each end thereof, outwardly of said frame members, shaft 60 is connected to one end of a crank-arm 69B. Each of said crank arms rotates through 360 degrees about the axis of its associated shaft. Each crank arm is pivotally connected at the other end thereof, as at 70A, in the case of arms 69A, and as at 70B, in the case of arms 69B, to one of a pair of lift or transfer arms 71.

It will be noted that there are two lift arms 71, which are operable outwardly of the adjacent frame members 51.

Each lift arm is provided with a lateral flap or support 72 which extends partially inwardly from the end thereof remote from the elevator 13. The arms 69B are pivotally connected adjacent the ends of the associated lift arms provided with the flap 72 and the arms 69A are pivotally connected inwardly of the opposite ends of the associated lift arms.

As will be apparent from FIGS. 1 and 4 through 8, the lift arms 71 are rotated through full 360 degrees during the rotation of the crank-arms 69A and 69B by the shafts 59 and 60.

Frame 50 also mounts the endless belt conveyor 15, the arrangement being such that the transfer mechanism 14 is disposed between the elevator mechanism 13 and said conveyor. Conveyor 15 may be of any suitable construction and, as here shown, comprises an endless belt 73 mounted on a driven wheel 74 provided on a shaft 75 mounted on a bracket 76 provided on framework 50. It will be understood that belt 73 is driven by a suitable drive wheel (not shown) so that the upper run 79 thereof moves in the direction of arrow 77 and substantially in alignment with the top surface of platform 57, as depicted in FIG. 1.

As it is also possible to arrange conveyor arrangement 15 on a different level than that of platform 57 as just stated, FIGS. 4 to 8 illustrate the upper run 79 at a somewhat lower plane than that seen in FIG. 1. In any event, the transfer mechanism 14 is therefore also operable and transmits its plate- or tray-shaped articles to varying levels for further transportation in any desired direction.

In operation of the article handling system or apparatus 11, trays or similar articles 12 are positioned on the horizontal portions 28 of the lowermost pair of supports 22 of the elevator as said supports begin their ascent in the direction of arrow 24. It will be understood that the carrier arms 71—71 of the transfer mechanism rotate in timed relation with the travel of the supports 22 along the path of movement of the chains 21 in the elevator 13 so that prior to the time that a tray 12A arrives at the level of the frame members 51 of the transfer mechanism, the forward portions 78 of arms 71 are inserted between the assemblies 23A and 23B to underlie the tray as it approaches said level, as shown in FIGS. 1 and 4. When the tray is slightly above the level of frame members 51, it is engaged by the forward arm portions 78, as shown in FIG. 5.

Assuming that a tray 12B, which had been previously removed from the elevator 13, is in position on the bight 55 of pedestal 52, as shown in FIG. 4, as the lift arms 71 move through the broken line portion thereof shown in FIG. 5, the tray 12A is raised or lifted off from the elevator 13 by the forward arm portions 78 and the rear arm portions or flaps 72 engage the tray 12B, on the pedestal and lift it therefrom, as shown in FIG. 6.

FIG. 6 represents the uppermost position of the arms 71, FIG. 1 showing the lowermost position thereof; the arms 71 are then about to move rearwardly and downwardly from the position shown in FIG. 6 toward the position shown in FIG. 7 in which tray 12A is deposited on the bight 55 or platform 72. Continued movement of the lifter arms 71 of conveyor means 71—78 in clockwise rotation, viewing FIGS. 1 and 4 through 8, results in the deposition of the tray 12B on the upper run 79 of conveyor belt 73, as shown in FIG. 8, the latter tray being now carried to a delivery or unloading station in accordance with arrow 77. The described cycle of operation is repeated, as the arms 71, free of trays, move in clockwise direction, as indicated by arrow 80, from the position thereof shown in FIG. 8 again toward the position thereof shown in FIG. 1.

It will be noted, that the trays or similar plate-shaped articles carrying objects thereon or not, are always maintained in substantially horizontal position during movement of the various conveyors and on the latter. On the first conveyor 13 the articles 12 (stacked or individually) are supported only at two opposite rims and that the arms 78 of the second conveyor contact and abut against the underface of said articles or trays at locations thereof determined intermediate said rims, so that the articles during the entire transporting cycle, are always held by and lie on their supports or feed devices in balanced and stabilized position.

The conveyor or like handling system of the invention is applicable and useful in various industries, requires only a minimum of space and employs instrumentalities and parts which are most simple; extend and fit into one another for coaction and uninterrupted operation, while the articles may or may not arrive at an intermediate station of rest or deposit, if desired.

Various changes and modifications may be made without departing from the spirit and scope of the present invention and it is intended that these modifications and changes be embraced by the annexed claims.

Having thus described the invention, what is claimed as new and desired to be secured by Letters Patent is:

1. Apparatus for handling trays or the like comprising a pair of opposing spaced vertically movable conveyor devices for upward movement of said trays, horizontally movable conveyor means for carrying the trays to a delivery position, and a tray transfer mechanism operating in timed sequence to said vertically movable conveyor devices and including means movable to move a first tray from a rest position intermediate said vertical conveyor devices and said horizontal conveyor means to the latter and to move a second tray from said vertical conveyor devices to said rest position.

2. Apparatus as set forth in claim 1, said rest position being a pedestal means interposed between said vertical conveyor devices and said horizontal conveyor means.

3. Apparatus as set forth in claim 2, said transfer mechanism having a pair of laterally spaced rotary arms which straddle said pedestal and said horizontal conveyor means during rotation thereof and which are insertable during said rotation between said vertical conveyor devices to lift a tray therefrom for deposition on said pedestal.

4. Apparatus as set forth in claim 3, said arms having a longitudinal dimension sufficient to accommodate two trays.

5. Apparatus as set forth in claim 4, said arms having flap means at one end thereof to transfer the trays from said pedestal means to said horizontal conveyor means.

6. Apparatus as set forth in claim 5, and said arms having straight edge portions at the other ends thereof to transfer the trays from said vertical conveyor devices to said horizontal conveyor means.

7. Apparatus as set forth in claim 1, and drive means common to said vertical conveyor devices and said transfer mechanism to effect timed operation thereof.

8. Apparatus as set forth in claim 7, said drive means comprising a motor, transmission means for operating said vertical conveyor devices in opposite directions, respectively, and means operable by said transmission means for operating said transfer mechanism.

9. Apparatus as set forth in claim 8, said motor being a reversible motor and reversible switch means for said motor.

10. Apparatus as set forth in claim 1, said vertical conveyor devices having opposing paired tray carriers, and guide means for said carriers.

11. Apparatus as set forth in claim 1, each tray carrier having a horizontal portion for engaging one end of a tray and a vertical portion slidably engageable with said guide means during ascent of the tray.

12. Apparatus as set forth in claim 11, said guide means being a track means extending vertically of each of said vertical conveyor devices.

13. An apparatus for handling articles such as trays and the like comprising laterally spaced article supports movable in substantially parallel relationship through a vertical path arranged to contact the underside of an article and move it upwardly, substantially horizontal support means adjacent the location of the upper portions of the path of movement of the support, a transfer mechanism adjacent said horizontal support means including a transfer member means movable through a path intercepting the space between said supports and thereafter above and then below said horizontal support means, and means to move said article supports and to move said movable transfer member means in timed relationship to cause said movable member to contact the underside of the article after it has been elevated by said support and to deposit it on said horizontal support means as it moves therebelow.

14. An apparatus according to claim 13, wherein said horizontal support means is a movable conveyor.

15. An apparatus according to claim 13, wherein said horizontal support means is a fixed erect member.

16. An apparatus according to claim 13, wherein said horizontal support means includes a movable conveyor and a fixed support between said conveyor and said article support, said transfer member means being effective to deposit an article on said fixed support and to simultaneously move an article off said fixed support to said moving conveyor.

17. An apparatus for handling articles such as trays and the like comprising first and second laterally spaced vertically extending chain conveyor sets, a plurality of article supporting brackets secured to each of said chain conveyor sets at spaced locations along the length thereof, said chain conveyor sets being disposed so that opposed supporting brackets are in substantial horizontal alignment, means to move said chain conveyor sets to advance opposed sets of said supporting brackets upwardly in substantially parallel relationship, a fixed horizontal support adjacent the upper ends of said conveyor sets, a conveyor extending away from said fixed horizontal support, and a transfer mechanism operable in timed sequence to said chain conveyor sets including a member movable through a path upwardly between opposed supporting brackets to lift the articles off said brackets as they are moved upwardly in succession, said member being thereafter movable through a path to deposit the article on said fixed support and to continue to effect displacement of an article previously deposited on the support from said support onto said conveyor.

18. An apparatus according to claim 17, wherein said movable member means includes substantially parallel rotatable crank arms and a flat article supporting portion pivotally connected to each of said crank arms.

References Cited in the file of this patent

UNITED STATES PATENTS

| 1,141,600 | Baker | June 1, 1915 |
| 1,712,762 | Gibbs | May 14, 1929 |
| 1,858,619 | Delamere | May 17, 1932 |
| 2,061,358 | Hunter et al. | Nov. 17, 1936 |
| 2,517,905 | Mathews | Aug. 8, 1950 |
| 2,710,682 | Coll | June 14, 1955 |

FOREIGN PATENTS

| 750,485 | France | May 29, 1933 |
| 585,778 | Great Britain | Feb. 24, 1947 |